US008993927B2

(12) United States Patent
Peters

(10) Patent No.: US 8,993,927 B2
(45) Date of Patent: Mar. 31, 2015

(54) METHOD AND SYSTEM TO INCREASE HEAT INPUT TO A WELD DURING A SHORT-CIRCUIT ARC WELDING PROCESS

(71) Applicant: Lincoln Global, Inc., City of Industry, CA (US)

(72) Inventor: Steven R Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/764,203

(22) Filed: Feb. 11, 2013

(65) Prior Publication Data

US 2013/0213948 A1    Aug. 22, 2013

Related U.S. Application Data

(63) Continuation of application No. 12/163,047, filed on Jun. 27, 2008, now Pat. No. 8,373,093.

(51) Int. Cl.
*B23K 9/09* (2006.01)

(52) U.S. Cl.
CPC ............... *B23K 9/091* (2013.01); *B23K 9/092* (2013.01)
USPC .......... 219/137 PS; 219/130.21; 219/130.32; 219/130.5; 219/130.51

(58) Field of Classification Search
USPC ............... 219/130.1, 130.21, 130.31–130.33, 219/130.51, 137 PS
See application file for complete search history.

(56) References Cited

U.S. PATENT DOCUMENTS

| 4,972,064 | A | 11/1990 | Stava |
| 6,051,810 | A * | 4/2000 | Stava ...................... 219/137 PS |
| 6,498,321 | B1 | 12/2002 | Fulmer et al. |
| 7,271,365 | B2 * | 9/2007 | Stava et al. ............... 219/130.51 |
| 2006/0226131 | A1 | 10/2006 | Stava et al. |
| 2008/0006612 | A1 | 1/2008 | Peters et al. |

FOREIGN PATENT DOCUMENTS

WO    WO-2007028858 A1    3/2007

* cited by examiner

*Primary Examiner* — Brian Jennison
(74) *Attorney, Agent, or Firm* — Perkins Coie LLP

(57) ABSTRACT

A method and a system to increase heat input to a weld during an arc welding process. A series of electric arc pulses are generated between an advancing welding electrode and a metal workpiece using an electric arc welding system capable of generating an electric welding waveform to produce the electric arc pulses. A cycle of the electric welding waveform includes a pinch current phase providing an increasing pinch current level, a peak current phase providing a peak current level, a tail-out current phase providing a decreasing tail-out current level, and a background current phase providing a background current level. At least one heat-increasing current pulse of the cycle is generated, providing a heat-increasing current level, during the background current phase, where the heat-increasing current level is above the background current level. The cycle of the electric welding waveform with the at least one heat-increasing current pulse may be repeated until the arc welding process is completed.

19 Claims, 7 Drawing Sheets

METHOD AND SYSTEM TO INCREASE HEAT INPUT TO A WELD DURING A SHORT-CIRCUIT ARC WELDING PROCESS

This application is a continuation of U.S. application Ser. No. 12/163,047, filed Jun. 27, 2008, now U.S. Pat. No. 8,373, 093, and which is herein incorporated by reference in its entirety.

CROSS-REFERENCE TO RELATED APPLICATIONS/INCORPORATION BY REFERENCE

U.S. Pat. No. 4,972,064, issued on Nov. 20, 1990, is incorporated herein by reference in its entirety. U.S. Pat. No. 6,051, 810, issued on Apr. 18, 2000, is incorporated herein by reference in its entirety. U.S. Pat. No. 6,498,321, issued on Dec. 24, 2002, is incorporated herein by reference in its entirety. U.S. patent application Ser. No. 11/861,379 filed on Sep. 26, 2007 is incorporated herein by reference in its entirety.

TECHNICAL FIELD

Certain embodiments relate to electric arc welding. More particularly, certain embodiments relate to a method of increasing heat input to a weld during a gas metal arc welding (GMAW) short-circuit arc process.

BACKGROUND

Open root welding is used for pipe and single-sided plate welding in situations that preclude welding from both sides of the material. This type of welding is common in the petrochemical and process piping industries. For many years, pipe fabricators have been searching for a faster, easier method to make single-sided open root welds. It is difficult, even for skilled welders, to weld open root pipe. Inflexible positioning makes pipeline welding more difficult, time consuming, and expensive. Higher strength pipe steels are driving a requirement to achieve a low hydrogen weld metal deposit. Gas tungsten arc welding (GTAW) has been an available process capable of achieving the quality requirements, however, GTAW root welds are expensive to make. The gas metal arc welding (GMAW) process has been avoided because of problems with sidewall fusion and lack of penetration.

Conventional constant voltage (CV) GMAW welding processes produce a flat internal bead, or "suck back" where the bead shrinks back into the root due to high weld puddle temperatures. GTAW welding produces good pipe welds, however, travel speeds may be slow and heat input may be high. Stick welding with cellulose electrodes provides good fusion characteristics but leaves deep wagon tracks (requiring more labor for grinding), a very convex root weld, and a high hydrogen deposit.

The Surface Tension Transfer (STT) process has been developed to make single-sided root welds on pipe, for example. STT is a controlled short-circuit transfer GMAW process that produces a low hydrogen weld deposit and makes it easier to achieve a high quality root weld in all positions. STT eliminates the lack of penetration and poor sidewall fusion problems encountered when using the traditional short-arc GMAW process.

The STT process produces a low hydrogen weld metal deposit in open root joints with easier operation, better back beads, better sidewall fusion, and less spatter and fumes than other processes. STT differs from the traditional GMAW short-arc welding process in that the arc current is precisely controlled independently from the wire feed speed. Also, the arc current is carefully regulated to reduce puddle agitation and to eliminate violent "explosions" that occur during the traditional short-arc GMAW process.

Even though the current STT process is significantly better than the traditional short-arc GMAW process, especially for root welding application, the ability to better control heat input into the weld to achieve even better penetration without increasing the weld puddle fluidity is desired.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

A first embodiment of the present invention comprises a method of increasing heat input to a weld during an arc welding process by generating a series of electric arc pulses between an advancing welding electrode and a metal workpiece using an electric arc welding system capable of generating an electric welding waveform to produce the electric arc pulses. The method includes:

(a) regulating an output current level of the waveform to a background current level to sustain an electric arc between the electrode and the workpiece, producing a molten metal ball on a distal end of the electrode;

(b) dropping the output current level below the background current level in response to the molten metal ball shorting to the workpiece and extinguishing the electric arc, to allow the molten metal ball to wet into a puddle on the workpiece;

(c) automatically increasing the output current level above the background current level to induce the molten metal ball to pinch off from the distal end of the electrode;

(d) decreasing the output current level below the background current level as the molten metal ball pinches off from the distal end of the electrode onto the workpiece, re-establishing an electric arc between the electrode and the workpiece;

(e) increasing the output current level to a peak current level of the waveform in response to re-establishing the electric arc;

(f) decreasing the output current level toward the background current level, producing a next molten metal ball on the distal end of the electrode;

(g) pulsing the output current level, between the background current level and an intermediate current level being between the background current level and the peak current level, at a pre-defined pulse rate until a next short is established between the next molten metal ball and the workpiece; and (h) repeating steps (b) through (g) until the arc welding process is completed.

Another embodiment of the present invention comprises a method of increasing heat input to a weld during an arc welding process by generating a series of electric arc pulses between an advancing welding electrode and a metal workpiece using an electric arc welding system capable of generating an electric welding waveform to produce the electric arc pulses. The method includes:

(a) generating a base cycle of the electric welding waveform having a background current phase providing a background current level, a peak current phase providing a peak current level, and a tail-out current phase providing a monotonically decreasing tail-out current level;

(b) generating a pinch current phase of the electric welding waveform, between the background current phase and the peak current phase, providing a monotonically increasing pinch current level; and (c) generating at least one heat-increasing current pulse of the electric welding waveform, during the background current phase, providing an intermediate current level being between the background current level and the peak current level.

The method may further include periodically repeating the background current phase, the pinch current phase, the peak current phase, and the tail-out current phase in succession such that the background current phase includes the at least one heat-increasing current pulse. The method may also include decreasing a current level of the electric welding waveform below the background current level at an end of the background current phase, and decreasing a current level of the electric welding waveform below the background current level at an end of the pinch current phase.

A further embodiment of the present invention comprises a system for increasing heat input to a weld during an arc welding process by generating an electric welding waveform to produce a series of electric arc pulses between an advancing welding electrode and a metal workpiece. The system includes a first configuration of electronic components to generate a background current phase, a peak current phase, and a tail-out current phase of the electric welding waveform, wherein the background current phase provides a background current level, the peak current phase provides a peak current level, and the tail-out current phase provides a monotonically decreasing tail-out current level. The system also includes a second configuration of electronic components to generate a pinch current phase of the electric welding waveform, wherein the pinch current phase provides a monotonically increasing pinch current level. The system further includes a third configuration of electronic components to generate at least one heat-increasing current pulse of the electric welding waveform during the background current phase, wherein the at least one heat-increasing current pulse provides an intermediate current level that is between the background current level and the peak current level. The system may further include a fourth configuration of electronic components to decrease a current level of the electric welding waveform below the background current level at an end of the background current phase in response to the electrode shorting to the workpiece. The system may also include a fifth configuration of electronic components to decrease a current level of the electric welding waveform below the background current level at an end of the pinch current phase in anticipation of the electrode de-shorting from the workpiece.

Another embodiment of the present invention comprises a system for increasing heat input to a weld during an arc welding process by generating an electric welding waveform to produce a series of electric arc pulses between an advancing welding electrode and a metal workpiece. The system includes means for generating a background current phase, a peak current phase, and a tail-out current phase of the electric welding waveform, wherein the background current phase provides a background current level, the peak current phase provides a peak current level, and the tail-out current phase provides a decreasing tail-out current level. The system further includes means for generating a pinch current phase of the electric welding waveform, wherein the pinch current phase provides an increasing pinch current level. The system also includes means for generating at least one heat-increasing current pulse of the electric welding waveform during the background current phase, wherein the at least one heat-increasing current pulse provides an intermediate current level that is between the background current level and the peak current level. The system further includes means for periodically re-generating the background current phase, the pinch current phase, the peak current phase, and the tail-out current phase in succession such that the background current phase includes the at least one heat-increasing current pulse. The system may also include means for decreasing a current level of the electric welding waveform below the background current level at an end of the background current phase in response to the electrode shorting to the workpiece. The system may further include means for decreasing a current level of the electric welding waveform below the background current level at an end of the pinch current phase in anticipation of the electrode de-shorting from the workpiece.

In accordance with an embodiment of the present invention, the arc welding process may be a gas metal arc welding (GMAW) process using, for example, argon and $CO_2$ as shielding gases, or $CO_2$ by itself. The welding electrode may include steel or stainless steel. In accordance with an embodiment of the present invention, the background current level may be about 70 amps, the peak current level may be about 330 amps, and the intermediate current level may be about 210 amps. In accordance with an embodiment of the present invention, the pre-defined pulse rate of the heat-increasing current pulses may be about 333 Hz and a wire feed speed of the arc welding process may be about 150 inches per minute.

These and other features of the claimed invention, as well as details of illustrated embodiments thereof, will be more fully understood from the following description and drawings.

DETAILED DESCRIPTION

Figure 1:
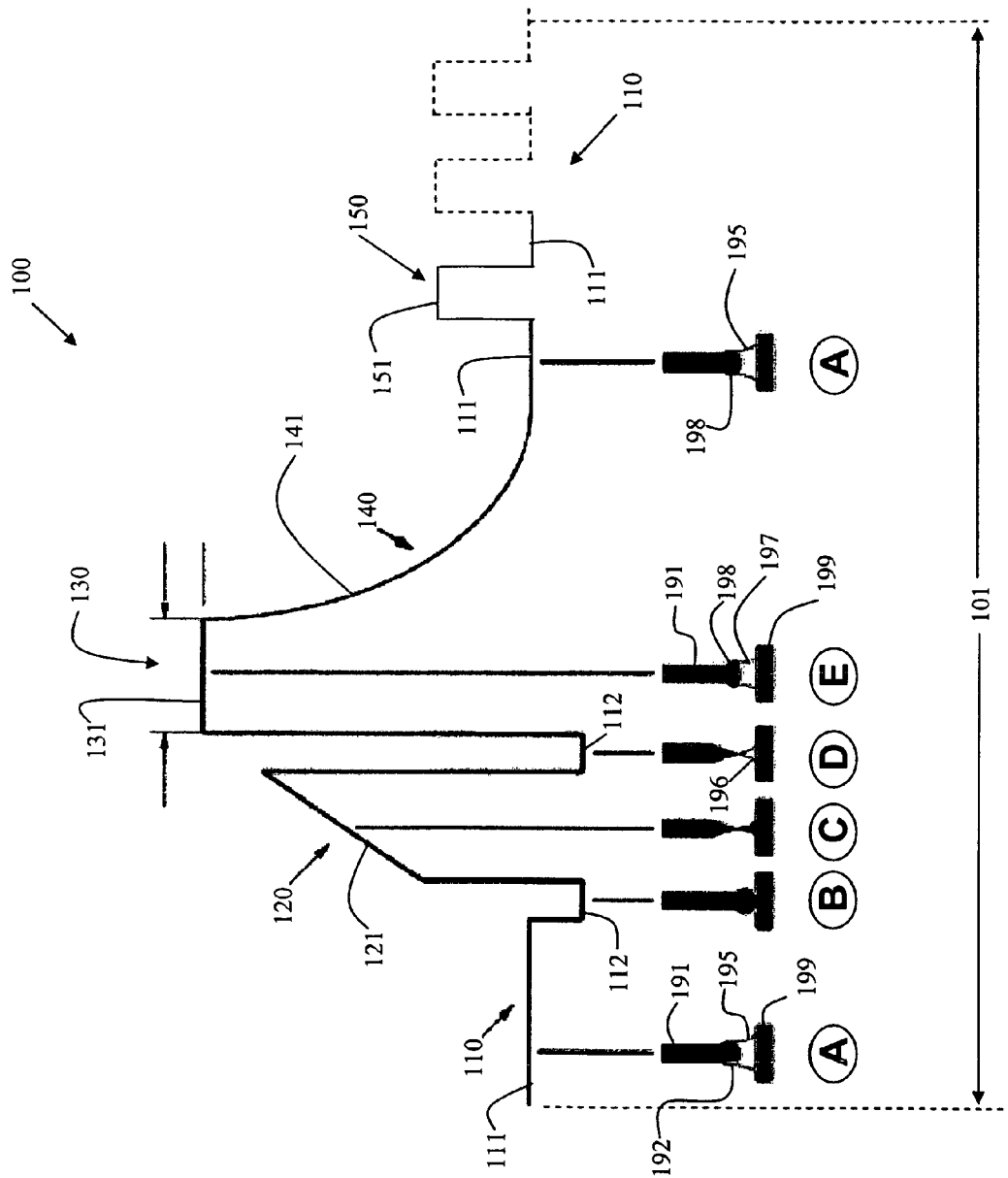
FIG. 1A illustrates an exemplary embodiment of a cycle of an electric welding waveform used in an arc welding process to increase heat input to a weld.
FIG. 1B illustrates the various stages of the arc welding process over the cycle of FIG. 1A using the electric welding waveform of FIG. 1A, showing the relationship between a welding electrode and a metal workpiece.

FIG. 1A illustrates an exemplary embodiment of a cycle 101 of an electric welding waveform 100 used in an arc welding process to increase heat input to a weld. FIG. 1B illustrates the various stages (A-E) of the arc welding process over the cycle 101 using the electric welding waveform of FIG. 1A, showing the relationship between a welding electrode 191 and a metal workpiece 199. During an arc welding process, a series of electric arc pulses are generated between the advancing electrode 191 and the metal workpiece 199 using an electric arc welding system capable of generating the electric welding waveform 100 to produce the electric arc pulses. In general, the cycle 101 periodically repeats during the arc welding process to produce the resultant weld. However, the cycle 101 may repeat without the same number of heat increasing pulses 150 and possibly without a pinch current phase 120 if a short condition does not occur.

The cycle 101 of the electric welding waveform 100 includes a background current phase 110 providing a background current level 111, a pinch current phase 120 providing a monotonically increasing pinch current level 121, a peak current phase 130 providing a peak current level 131, and a tail-out current phase 140 providing a monotonically decreasing tail-out current level 141.

During the background current phase 110, an electric arc 195 is sustained between the electrode 191 and the workpiece 199 producing a molten metal ball 192 on a distal end of the electrode 191 (see stage A in FIG. 1B). At stage B, the molten metal ball 192, still connected to the electrode 191, shorts to the workpiece 199. When the short occurs, the arc 195 is extinguished and the current level of the waveform 100 is dropped below the background current level 111 to a current level 112, allowing the molten ball 192 to wet into a puddle on the workpiece 199.

During the pinch current phase 120, the current level of the waveform 100 is increased monotonically (e.g., ramped upward) above the background current level 111, providing the increasing pinch current level 121 which causes the shorted molten metal ball 192 to begin to pinch off from the distal end of the electrode 191 into the puddle of the workpiece 199 as shown in stage C of FIG. 1B. As the molten metal ball 192 is about to pinch off from the electrode 191, the current level of the waveform 100 is again dropped below the background current level 111 to a current level 112 to avoid spatter, and an arc 196 is re-established between the electrode 191 and the workpiece 199.

Once the arc 196 is re-established, the waveform 100 enters the peak current phase 130. During the peak current phase 130, the current level of the waveform 100 is increased to and held at the peak current level 131. In accordance with an embodiment, the peak current level 131 is the highest current level of the waveform 100 and establishes an arc 197 between the electrode 191 and the workpiece 199 of sufficient strength to begin forming a next molten metal ball 198 at the distal end of the electrode 191.

After the peak current phase 130, the waveform 100 enters the tail-out current phase 140. During the tail-out current phase 140, the current level of the waveform 100 monotonically (e.g., exponentially) decreases toward the background current level 111 providing the decreasing tail-out current level 141. The current of the waveform 100 inputs heat into the weld. The tail-out current phase 140 acts as a coarse heat control phase for the waveform 100 whereas the background current phase 110 acts as a fine heat control phase for the waveform 100. However, in certain arc welding applications, it may be desirable to provide additional heat input control.

After the tail-out current phase 140, the background current phase 110 is again entered, providing the background current level 111 and producing a substantially uniform next molten metal ball 198 at the distal end of the electrode 191 (stage A). During the background current phase 110, at least one heat-increasing current pulse 150 is generated, providing an intermediate current level 151 that is between the background current level 111 and the peak current level 131. The heat increasing current pulse 150 may be periodically repeated within the background current phase 110 until a next short between the molten metal ball 198 and the workpiece 199 occurs, at which time the arc 195 is extinguished and the current level of the waveform 100 is dropped below the background current level 111 to a current level 112, allowing the next molten ball 198 to wet into the puddle on the workpiece 199 (stage B).

The heat-increasing current pulses 150 serve to re-heat the puddle and surrounding area to increase penetration. Such an increase in heat provided by the heat-increasing current pulses 150 may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. Again, in general, the cycle 101 periodically repeats during the arc welding process to produce the resultant weld. However, the cycle 101 may repeat without the same number of heat increasing pulses 151 and possibly without the pinch current phase 120 if a short does not occur. As used herein, the term "current level" refers to a current amplitude which is substantially steady but may have some variations due to the somewhat in-exact nature of producing an electric welding waveform.

As an example, in accordance with an embodiment of the present invention, the arc welding process is a gas metal arc welding (GMAW) process using argon and carbon dioxide as shielding gases. The background current level 111 is about 70 amps, the peak current level 131 is about 330 amps, and the intermediate current level 151 is about 210 amps. The pulsewidth of a single heat-increasing pulse 150 is about 1 millisecond and may be repeated about every 3 milliseconds, up to three to six pulses during the background current phase 110. The period of the cycle 101 is about 15 milliseconds.

Figure 2:
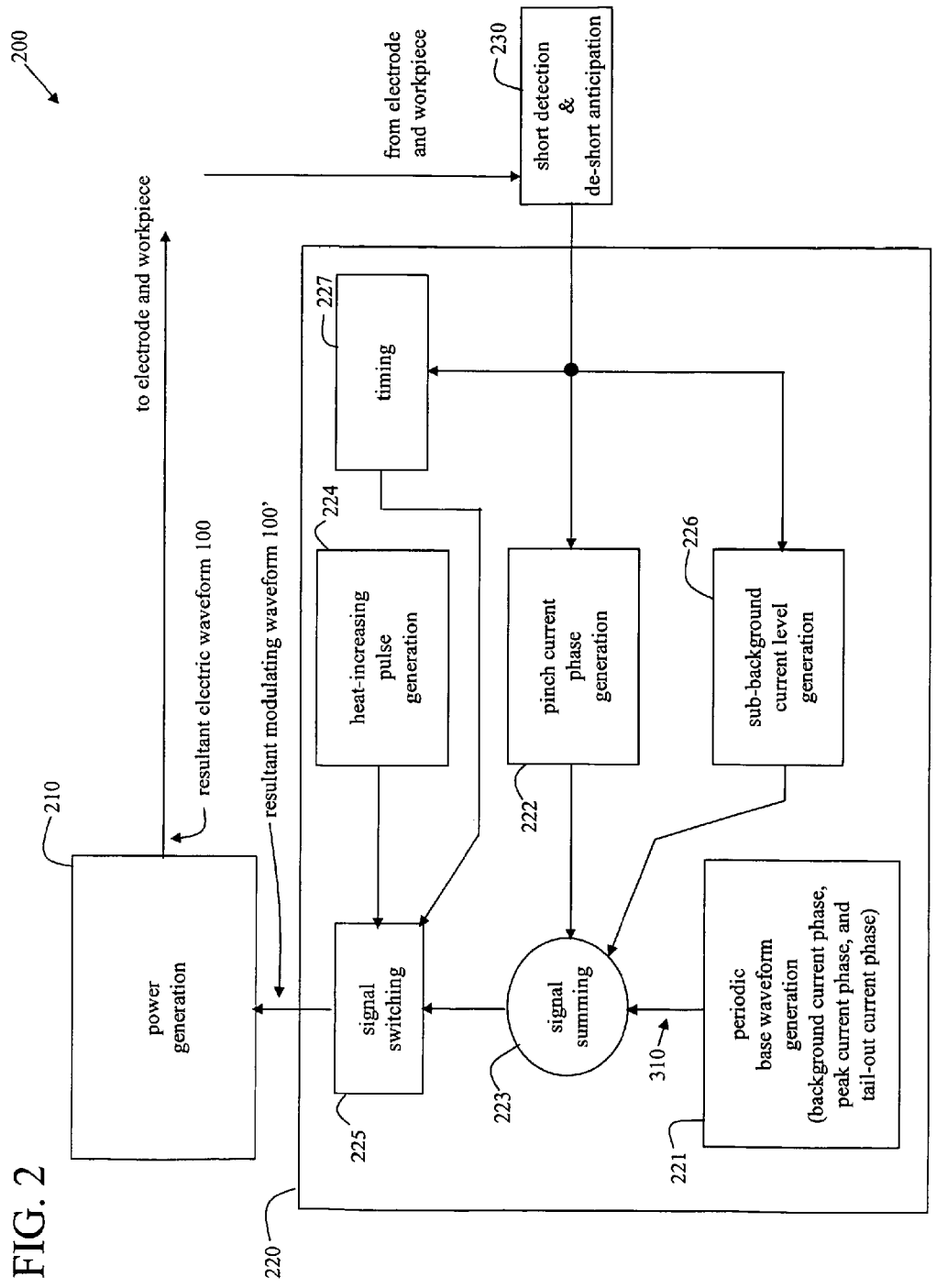
FIG. 2 illustrates a functional block diagram of a first exemplary embodiment of a system for generating the electric welding waveform of FIG. 1.

FIG. 2 illustrates a functional block diagram of a first exemplary embodiment of a system 200 for generating the electric welding waveform 100 of FIG. 1. The system 200 provides power generation capability 210 and modulating waveform generation and shaping capability 220 to create a modulating waveform 100'. The system 200 also provides short detection and premonition detection (de-short anticipation) capability 230 to detect when a short condition occurs between the electrode 191 and the workpiece 199 and to anticipate when a short condition is about to terminate (de-short condition) as a molten metal ball (e.g., 192) pinches off into the puddle on the workpiece 199.

Figure 3:
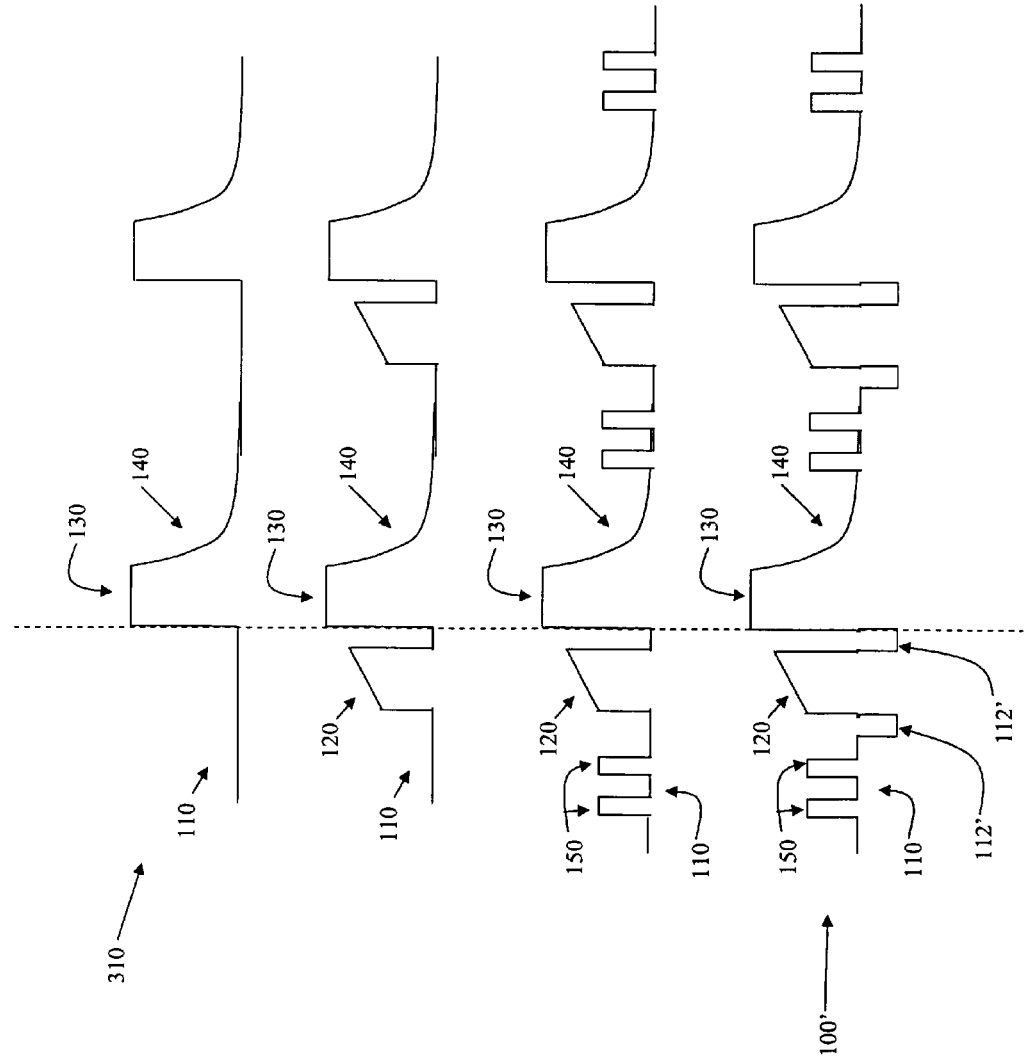
FIGS. 3A-3D illustrate exemplary embodiments of portions of a modulating waveform as generated by the various capabilities of the system of FIG. 2.

A modulating waveform 100' generated by the modulating waveform generation and shaping capability 220 is used to modulate the power generation capability 210 which provides electric current to the electrode 191 and workpiece 199 in the form of the electric welding waveform 100. The modulating waveform generation and shaping capability 220 includes a periodic base waveform generation capability 221. FIGS. 3A-3D illustrate exemplary embodiments of portions of the modulating waveform 100' as generated by the various capabilities of the system 200 of FIG. 2. FIG. 3A illustrates a periodic base waveform portion 310 generated by the periodic base waveform generation capability 221. The periodic base waveform generation capability 221 provides the generation of the background current phase 110, peak current phase 130, and tail-out current phase 140 of the modulating waveform 100' in a periodic manner.

The modulating waveform generation and shaping capability 220 also includes a pinch current phase generation capability 222. FIG. 3B illustrates the periodic base waveform portion 310 of FIG. 3A having the pinch current phase 120 added. In accordance with an embodiment of the present invention, the pinch current phase 120 may be summed with the periodic base waveform portion 310 using a signal summing capability 223 of the modulating waveform generation and shaping capability 220.

The modulating waveform generation and shaping capability 220 further includes a heat-increasing pulse generation capability 224. FIG. 3C illustrates the periodic base waveform portion 310 of FIG. 3A having the pinch current phase 120 of FIG. 3B and having the heat-increasing pulses 150 switched in during the background current phase 110. In accordance with an embodiment of the present invention, the heat-increasing current pulses 150 may be switched in during the background current phase 110 using a signal switching capability 225 of the modulating waveform generation and shaping capability 220.

The modulating waveform generation and shaping capability 220 also includes a sub-background current level generation (current reducing) capability 226. FIG. 3D illustrates the periodic base waveform portion 310 of FIG. 3A having the pinch current phase 120 of FIG. 3B, the background current phase 110 having the heat-increasing current pulses 150 as shown in FIG. 3C, and having the sub-background current portions 112' added. In accordance with an embodiment of the present invention, the sub-background current portions 112' may be summed with the periodic base waveform portion 310 and the pinch current phase 120 using the signal summing capability 223 of the waveform generation and shaping capability 220.

The resultant modulating waveform 100' of FIG. 3D is used to modulate the power generation capability 210 to provide the actual current levels (111, 112, 121, 131, 141, 151) of the various portions of the electric welding waveform 100 to the electrode 191 and the workpiece 199 as shown in FIG. 1 and FIG. 2.

During a welding process using the system 200, the short detection and de-short anticipation capability 230 monitors current and voltage at the electrode 191 and the workpiece 199 and detects when a short condition occurs between the electrode 191 and the workpiece 199 and also anticipates when the short condition is about to terminate (de-short condition). When a short condition occurs, the sub-background current level capability 226 immediately pulls the current level of the waveform 100 below the background current level 110 to a current level 112, in response to the short condition being detected, allowing a molten metal ball to wet into a puddle on the workpiece 199 as described previously herein. Then the pinch current phase generation capability 222 applies the monotonically increasing pinch current level 121 to the waveform 100.

When a de-short condition is anticipated (i.e., the molten metal ball is about to pinch off from the distal end of the electrode), the sub-background current level capability 226 again pulls the current level of the waveform 100 below the background current level 110 to the current level 112, in response to the de-short condition being anticipated, in order to avoid splatter. Furthermore, a timing capability 227 of the waveform generation and shaping capability 220 is triggered. The timing capability 227 counts down over the time segments occupied by the peak current phase 130 and the tail-out current phase 140 until the waveform 100 reaches the background current phase 110.

In accordance with an embodiment of the present invention, the timing capability is pre-programmed with the amount of time occurring between the de-short condition and entrance into the background current phase 110. Once the timing capability 227 finishes counting down, indicating that the background current phase 110 has been entered, the signal switching capability 225 is triggered to switch in the heat-increasing pulses 150 from the heat-increasing pulse generation capability 224. The heat-increasing pulses 150 are switched into the waveform 100 during the background current phase 110 until a next short condition is detected.

The various functional capabilities of the system 200 of FIG. 2 may be implemented using configurations of electronic components which may include analog and/or digital electronic components. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation. Various examples of such configurations of electronic components may be found in U.S. Pat. No. 4,972,064, U.S. Pat. No. 6,051,810, U.S. Pat. No. 6,498,321, and U.S. patent application Ser. No. 11/861,379, each of which is incorporated herein by reference in its entirety.

In accordance with an embodiment of the present invention, the system 200 includes a first configuration of electronic components to generate the background current phase 110, the peak current phase 130, and the tail-out current phase 140 of the electric welding waveform 100. The system 200 further includes a second configuration of electronic components to generate the pinch current phase 120 of the electric welding waveform 100. The system 200 also includes a third configuration of electronic components to generate at least one heat-increasing current pulse 150 of the electric welding waveform 100 during the background current phase 110.

In accordance with an embodiment of the present invention, the system 200 also includes a fourth configuration of electronic components to decrease the current level of the electric welding waveform 100 below the background current level at an end of the background current phase 110 in response to the electrode shorting to the workpiece. The system 200 further includes a fifth configuration of electronic components to decrease the current level of the electric welding waveform 100 below the background current level at an end of the pinch current phase 120 in anticipation of the electrode de-shorting from the workpiece.

The first through fifth configurations of electronic components may not necessarily be independent of each other but may share certain electronic components. For example, in accordance with an embodiment of the present invention, many of the electronic components of the first configuration may be the same as many of the electronic components of the third configuration. Similarly, many of the electronic components of the fourth configuration may be the same as many of the electronic components of the fifth configuration. Other shared components may be possible as well, in accordance with various embodiments of the present invention.

The functional implementation shown in FIG. 2 illustrates one exemplary embodiment. Other embodiments are possible as well. For example, in accordance with another embodiment, the pinch current phase 120 may be switched into the modulating waveform 100' via signal switching capability 225, instead of being summed in via signal summing capability 223. Similarly, the heat-increasing pulses 150 may be summed into the modulating waveform 100' via signal summing capability 223, instead of being switched in via signal switching capability 225. In accordance with another embodiment, the sub-background current level generation capability 226 may not be present, or may be optional, allowing generation of a modulating waveform that does not include the current level portions 112'. Other modified embodiments are possible as well, which result in generating the electric welding waveform 100 of FIG. 1 or similar waveforms having at least one heat-increasing current pulse during a background current phase.

Figure 4:
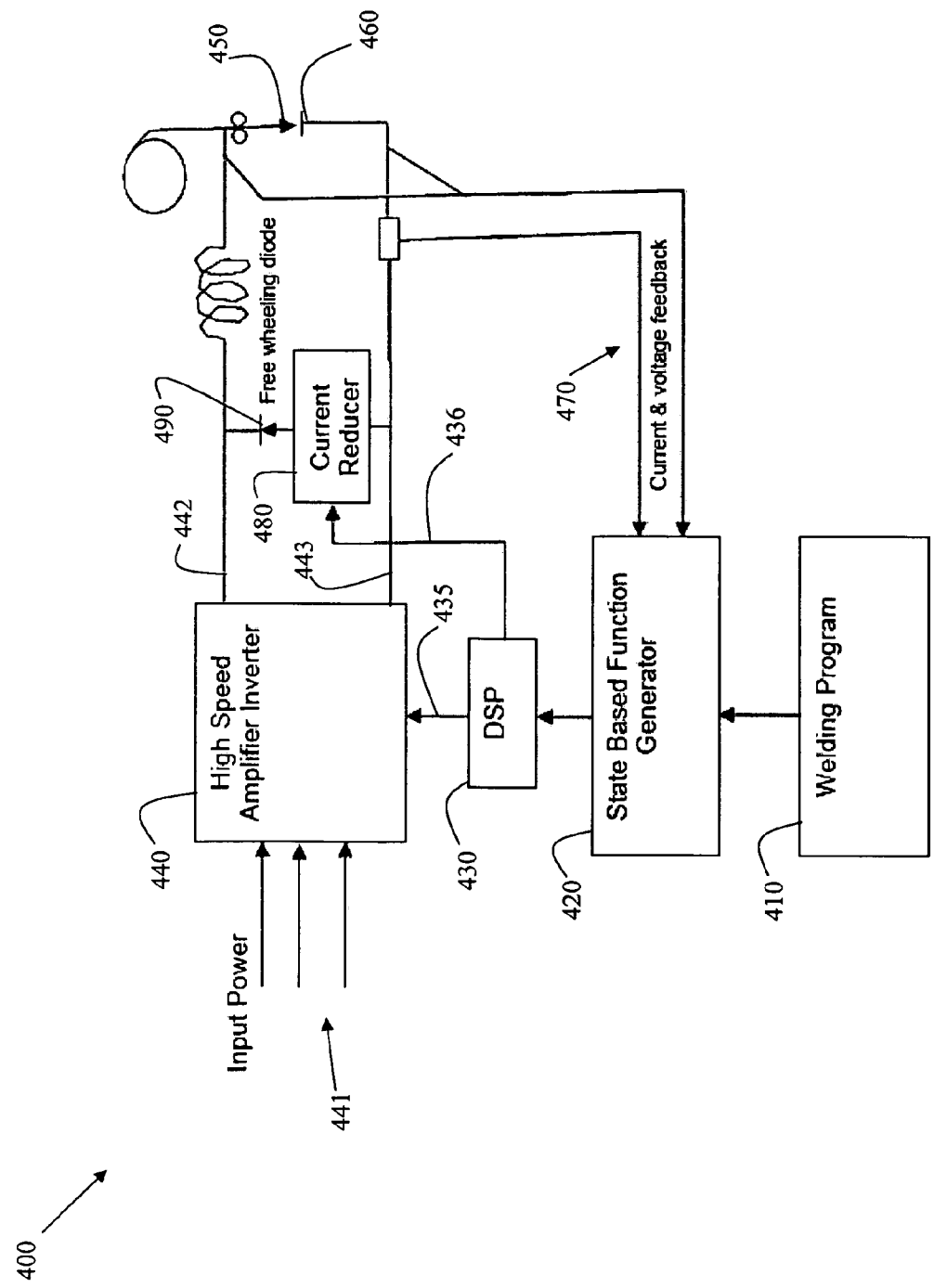
FIG. 4 illustrates a functional block diagram of a second exemplary embodiment of a system for generating the electric welding waveform of FIG. 1.

FIG. 4 illustrates a functional block diagram of a second exemplary embodiment of a system 400 for generating the electric welding waveform 100 of FIG. 1. The system 400 is a state machine type of system as is described herein. The Lincoln Electric Power Wave™ 450 system is an example of a state machine type of welding system.

The system 400 includes a welding program 410 loaded onto a state based function generator 420. In accordance with an embodiment of the present invention, the state based function generator 420 includes a programmable microprocessor device. The welding program 410 includes the software instructions for generating an electric welding waveform. The system further includes a digital signal processor (DSP) 430 operationally interfacing to the state based function generator 420. The system also includes a high speed amplifier inverter 440 operationally interfacing to the DSP 430.

The DSP 430 takes its instructions from the state based function generator 420 and controls the high speed amplifier inverter 440. The high speed amplifier inverter 440 transforms a high voltage input power 441 into a low voltage welding output power in accordance with control signals 435 from the DSP 430. For example, in accordance with an embodiment of the present invention, the DSP 430 provides control signals 435 which determine a firing angle (timing of switch activation) for the high speed amplifier inverter 440 to produce various phases of an electric welding waveform.

The outputs 442 and 443 of the high speed amplifier inverter 440 are operationally connected to a welding electrode 450 and a workpiece 460 respectively to provide a welding current which forms an electric arc between the electrode 450 and the workpiece 460. The system 400 also includes voltage and current feedback capability 470 which senses a voltage between the electrode 450 and the workpiece 460 and which senses current flowing through the welding circuit formed by the electrode 450, the workpiece 460, and high speed amplifier inverter 440. The sensed current and voltage are used by the state based function generator 420 to detect shorting of the electrode 450 to the workpiece 460 (i.e., a short condition) and to detect when a molten metal ball is about to pinch off from the electrode 450 (i.e., a de-short condition).

The system 400 further includes a current reducer 480 and a diode 490. The current reducer 480 and the diode 490 are operationally connected between the outputs 442 and 443 of the high speed amplifier inverter 440. The current reducer 480 also operationally interfaces to the DSP 430. When a short condition occurs between the electrode 450 and the workpiece 460, the DSP 430 commands the current reducer 480, via a control signal 436, to pull the current level through the welding circuit below a predefined background current level. Similarly, when a de-short condition occurs (i.e., a molten metal ball pinches off from the distal end of the electrode 450) the DSP 430 commands the current reducer 480 to pull the current level through the welding circuit below a predefined background current level. In accordance with an embodiment of the present invention, the current reducer 480 includes a Darlington switch, a resistor, and a snubber.

Figure 5:
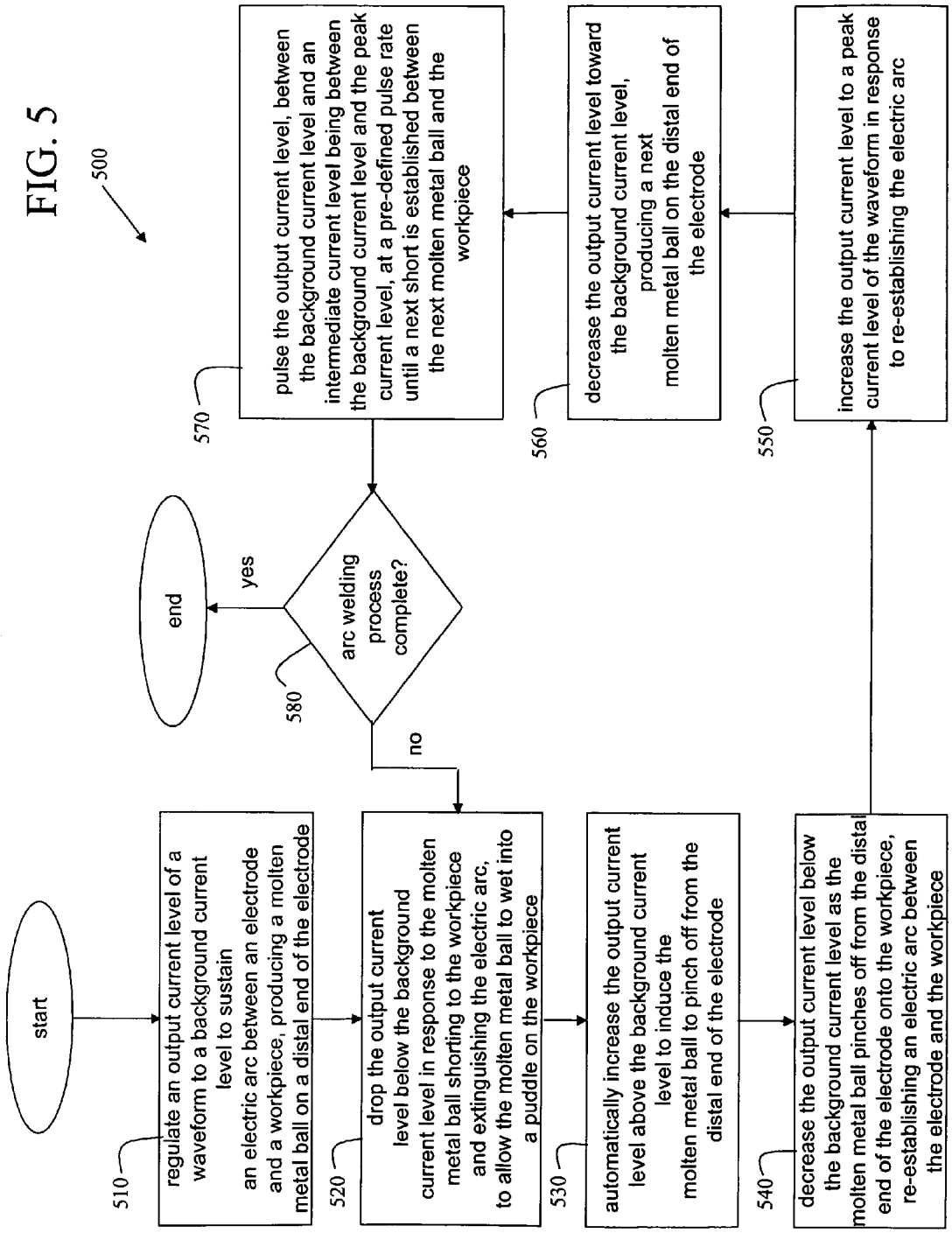
FIG. 5 illustrates a flowchart of a first exemplary embodiment of a method of increasing heat input to a weld during an arc welding process using the electric welding waveform of FIG. 1 and the system of FIG. 2 or the system of FIG. 4.

FIG. 5 illustrates a flowchart of a first exemplary embodiment of a method 500 of increasing heat input to a weld during an arc welding process using the electric welding waveform 100 of FIG. 1 and the system 200 of FIG. 2 or the system 400 of FIG. 4. In step 510, regulate an output current level of the waveform 100 to a background current level 111 to sustain an electric arc 195 between an electrode (e.g., 191 or 450) and a workpiece (e.g., 199 or 460), producing a molten metal ball 192 on a distal end of the electrode (e.g., 191 or 450). In step 520, drop the output current level below the background current level 111 in response to the molten metal ball 192 shorting to the workpiece (e.g., 199 or 460) and extinguishing the electric arc 195, to allow the molten metal ball 192 to wet into a puddle on the workpiece (e.g., 199 or 460). In step 530, automatically increase the output current level above the background current level 111 to induce the molten metal ball 192 to pinch off from the distal end of the electrode (e.g., 191 or 450).

In step 540, decrease the output current level below the background current level 111 as the molten metal ball 192 pinches off from the distal end of the electrode (e.g., 191 or 450) onto the workpiece (e.g., 199 or 460), re-establishing an electric arc 196 between the electrode (e.g., 191 or 450) and the workpiece (e.g., 199 or 460). In step 550, increase the output current level to a peak current level 131 of the waveform 100 in response to re-establishing an electric arc 196. In step 560, decrease the output current level toward the background current level 111, producing a next molten metal ball 198 on the distal end of the electrode (e.g., 191 or 450). In step 570, pulse the output current level, between the background current level 111 and an intermediate current level 151 being between the background current level 111 and the peak current level 131, at a pre-defined pulse rate until a next short is established between the next molten metal ball 198 and the workpiece (e.g., 199 or 460). In step 580, if the arc welding process is not completed, then proceed back to step 520, otherwise, end.

Figures 6A, 6B:
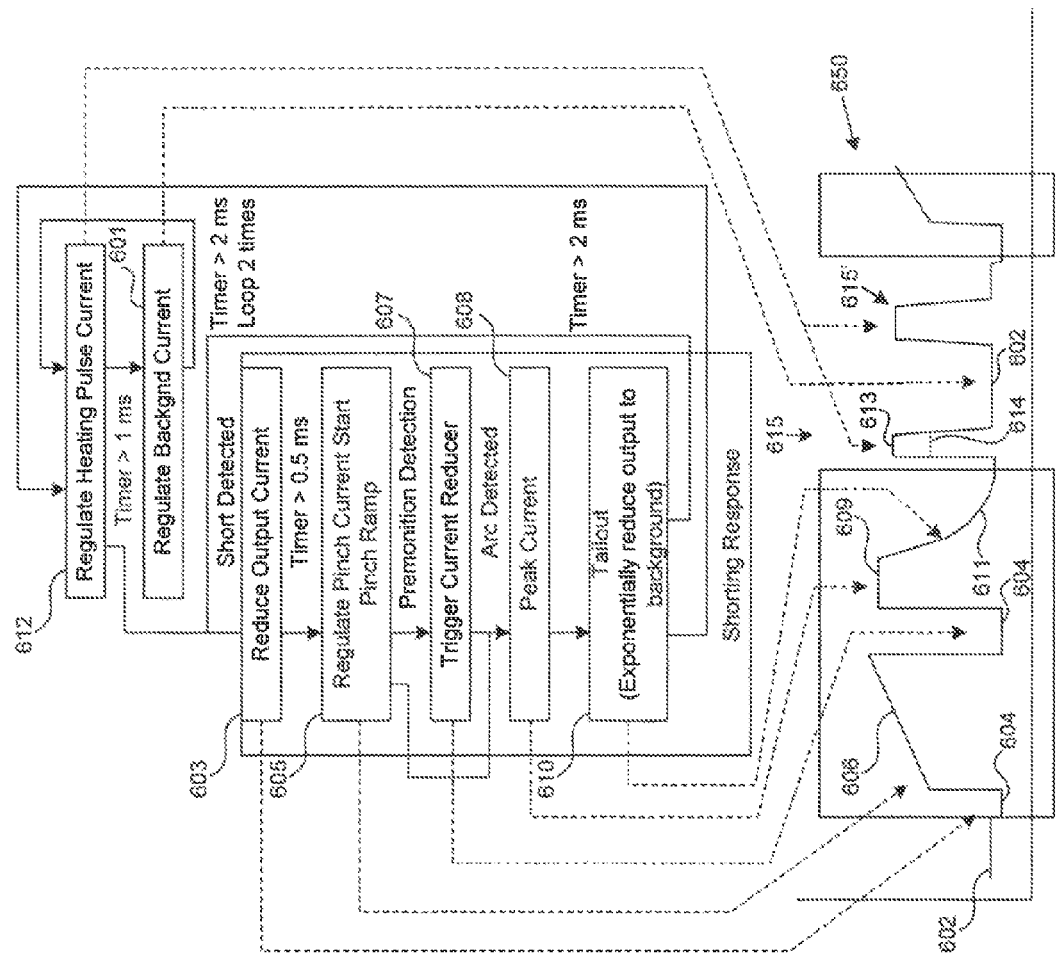
FIGS. 6A-6B illustrate a flowchart and resulting electric welding waveform of a second exemplary embodiment of a method of increasing heat input to a weld during an arc welding process using the system of FIG. 4.

FIGS. 6A-6B illustrate a flowchart and resulting electric welding waveform 650 of a second exemplary embodiment of a method 600 of increasing heat input to a weld during an arc welding process using the system 400 of FIG. 4. In step 601, regulate an output current level of an electric welding waveform 650 to a background current level 602. When a short condition is detected, then in step 603, reduce the output current level to a sub-level 604 being below the background current level 602 by triggering the current reducer 480. In step 605, start ramping the output current level according to a pinch current ramp 606. When a de-short condition (pinch off) is detected, then in step 607, reduce the output current level again to a sub-level 604 by triggering the current reducer 480.

In step 608, regulate the output current level to a peak current level 609 in response to re-establishing an arc between the electrode 450 and the workpiece 460. In step 610, decrease the output current level from the peak current level 609 toward the background current level 602 according to a monotonically decreasing tail-out current ramp 611. In step 612, regulate the output current level to a heat increasing current level 613 during a first pulse interval 614 forming a heat increasing current pulse 615.

The method 600 may alternate between step 601 and step 612 (i.e., the output current may switch back and forth between the heat increasing current level 613 and the background current level 602 forming subsequent heat increasing current pulses) for a pre-determined number of times, or until a next short condition is detected. Furthermore, in accordance with an embodiment of the present invention, the pulse width and amplitude of successive heat increasing current pulses 615' may be the same as or different from the pulse width and amplitude of the first heat increasing current pulse 615, depending on the specifics of the welding operation (e.g., weld metals, shielding gases, etc.).

Figure 7:
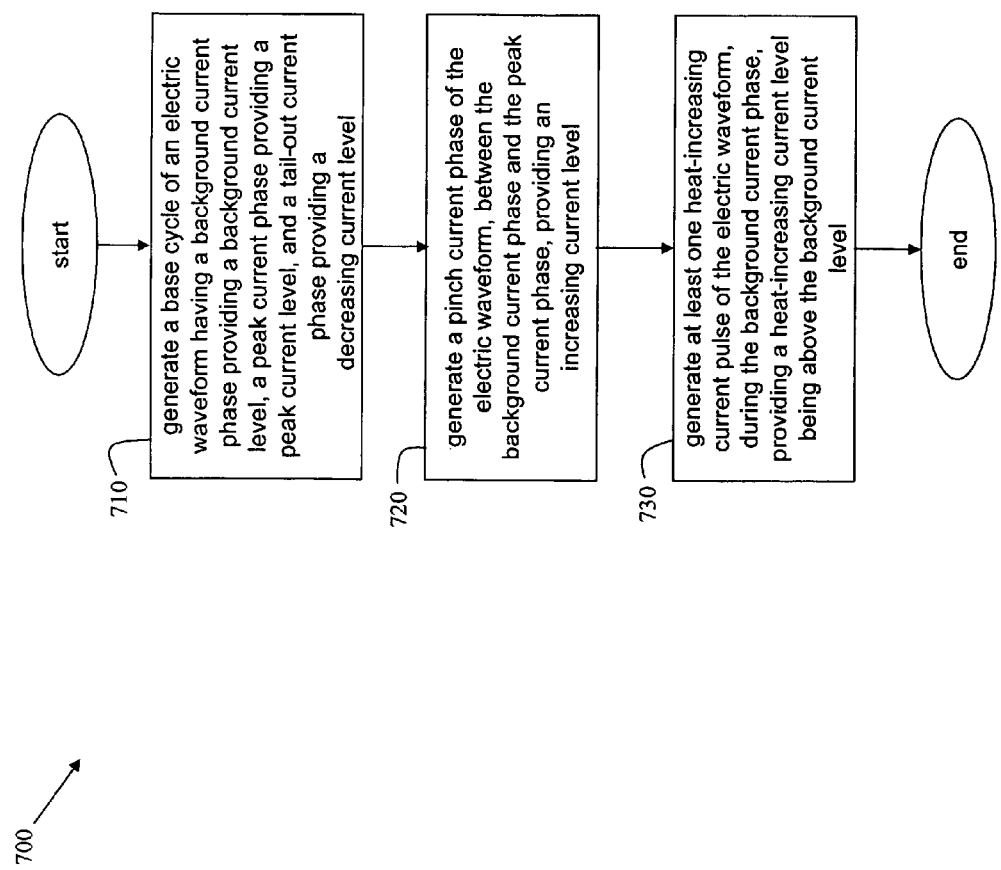
FIG. 7 illustrates a flowchart of a third exemplary embodiment of a method of increasing heat input to a weld during an arc welding process using the electric welding waveform of FIG. 1 or the electric welding waveform of FIG. 6B and the system of FIG. 2 or the system of FIG. 4.

FIG. 7 illustrates a flowchart of a third exemplary embodiment of a method 700 of increasing heat input to a weld during an arc welding process using the electric welding waveform 100 of FIG. 1 or the electric welding waveform 650 of FIG. 6B and the system 200 of FIG. 2 or the system 400 of FIG. 4. In step 710, generate a base cycle (e.g., 310) of an electric welding waveform (e.g., 100) having a background current phase (e.g., 110) providing a background current level (e.g., 111), a peak current phase (e.g., 130) providing a peak current level (e.g., 131), and a tail-out current phase (e.g., 140) providing a decreasing tail-out current level (e.g., 141). In step 720, generate a pinch current phase (e.g., 120) of the electric welding waveform (e.g., 100), between the background current phase (e.g., 110) and the peak current phase (e.g., 130), providing an increasing pinch current level (e.g., 121). In step 730, generate at least one heat-increasing current pulse (e.g., 150) of the electric welding waveform (e.g., 100), during the background current phase (e.g., 110), providing an intermediate current level (e.g., 151) being between the background current level (e.g., 111) and the peak current level (e.g., 131).

In summary, a method and a system to increase heat input to a weld during an arc welding process is disclosed. A series of electric arc pulses are generated between an advancing welding electrode and a metal workpiece using an electric arc welding system capable of generating an electric welding waveform to produce the electric arc pulses. A cycle of the electric welding waveform includes a pinch current phase providing an increasing pinch current level, a peak current phase providing a peak current level, a tail-out current phase providing a decreasing tail-out current level, and a background current phase providing a background current level. At least one heat-increasing current pulse of the cycle is generated, providing a heat-increasing current level, during the background current phase, where the heat-increasing current level is above the background current level. The cycle of the electric welding waveform with the at least one heat-increasing current pulse may be repeated until the arc welding process is completed. The heat-increasing current pulses serve to re-heat the puddle and surrounding area to increase penetration. Such an increase in heat provided by the heat-increasing current pulses may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of welding, said method comprising:
generating an output current waveform and providing said output current waveform to an advancing electrode, where said output current waveform has a plurality of peak current pulse portions and a plurality of background current portions, where each of said plurality of said peak portions are separated by one of said background current portions; and
generating a plurality of current pulses during each of said background current portions in between said peak current pulse portions, wherein said plurality of current pulses during said background current portions have a current level which is intermediate to a current level for said background currents portions and a current level for each of said peak current portions, and wherein a current level for each of said plurality of current pulses in any one background current portion is the same.

2. The method of claim 1, further comprising generating at least one pinch current portion between said background current portion and said peak current pulse portions.

3. The method of claim 2, wherein generating at least one pinch current portion includes generating a pinch current portion that is monotonically increased.

4. The method of claim 1, further generating a current level in said waveform below said current level for said background currents portions.

5. The method of claim 1, wherein generating the plurality of current pulses of intermediate current level includes defining a pulse width for each current pulse, wherein the pulse widths are the same.

6. The method of claim 1, wherein generating the plurality of current pulses of intermediate current level includes defining a pulse width for each current pulse, wherein the pulse widths are different.

7. The method of claim 1, wherein generating the output current waveform includes generating a tail-out phase portion between the peak current pulse portions and the current pulses having the intermediate current levels.

8. The method of claim 7, wherein the tail-out phase portion defines a tail-out current level that decreases from the peak current level monotonically.

9. The method of claim 1, wherein generating the plurality of current-pulses of the intermediate current level is timed following a de-short condition.

10. A method of arc welding comprising:
forming a molten puddle and a welding arc between an electrode and a workpiece with an electric welding waveform having a background current phase defining a background current level and a peak current phase defining a peak current level;
re-heating the puddle and the workpiece with at least one heat-increasing current pulse in said waveform during said background current phase, said at least one heat-increasing current pulse defining an intermediate current level that is between said background current level and said peak current level.

11. The method of claim 10, further comprising pinching off a molten metal ball from the electrode with a pinch current phase in said waveform.

12. The method of claim 11, wherein pinching off the molten metal ball includes generating a pinch current portion that is monotonically increased.

13. The method of claim 10, further comprising extinguishing the arc between said electrode and said workpiece with a current level in said waveform below side background current level.

14. The method of claim 10, further comprising re-establishing the arc between said electrode and said workpiece with a current level in said waveform below side background current level.

15. The method of claim 10, wherein re-heating the puddle with at least one heat-increasing current pulse includes reheating with a plurality of heat-increasing pulses each defining a pulse width for each current pulse, wherein the pulse widths of the heat-increasing current pulses are the same.

16. The method of claim 10, wherein re-heating the puddle with at least one heat-increasing current pulse includes reheating with a plurality of heat-increasing pulses each defining a pulse width for each current pulse, wherein the pulse widths of the heat-increasing current pulses are different.

17. A method of claim 16, wherein forming the welding puddle with the electric welding waveform includes defining a tail-out phase following the peak current phase.

18. The method of claim 17, wherein the tail-out phase defines a tail-out current level that decreases monotonically.

19. The method of claim 10, wherein re-heating the puddle and the workpiece with the at least one heat-increasing current pulse is timed following a de-short condition.

* * * * *